(12) United States Patent
Schreiber et al.

(10) Patent No.: US 6,760,862 B1
(45) Date of Patent: Jul. 6, 2004

(54) METHODS AND APPARATUS FOR PERFORMING A MAINTENANCE PROCEDURE ON A DATA STORAGE SYSTEM

(75) Inventors: Moshe Schreiber, Brookline, MA (US); Arod Shatil, Chestnut Hill, MA (US); Stefano Sguazzin, Milford, MA (US)

(73) Assignee: EMC Corporation, Hopkinton, MA (US)

( * ) Notice: Subject to any disclaimer, the term of this patent is extended or adjusted under 35 U.S.C. 154(b) by 492 days.

(21) Appl. No.: 09/862,813

(22) Filed: May 22, 2001

(51) Int. Cl.[7] .............................................. G06F 11/00
(52) U.S. Cl. ........................................ 714/15; 714/16
(58) Field of Search ............................... 714/15, 16, 5, 714/19, 21, 31, 42, 49, 50, 51

(56) References Cited

U.S. PATENT DOCUMENTS 5,852,650 A * 12/1998 Hyyrynen et al. ....... 379/29.01
6,105,148 A * 8/2000 Chung et al. ................. 714/16
6,205,558 B1 * 3/2001 Sobel ........................... 714/15

* cited by examiner

Primary Examiner—Robert Beausoliel
Assistant Examiner—Christopher McCarthy
(74) Attorney, Agent, or Firm—Chapin & Huang, L.L.C.; David E. Huang, Esq.

(57) ABSTRACT

A service processor has a memory, and a controller coupled to the memory. The controller is configured to perform part of a maintenance procedure on a data storage system such that a state of the data storage system transitions from a first state to a second state, and store, in a memory, a data structure identifying the second state. The controller is further configured to, after the maintenance procedure is aborted prior to completion of the maintenance procedure and after a transition of the state of the data storage system from the second state to a third state, (i) restore the data storage system to the second state based on the data structure stored in the memory, and (ii) complete the maintenance procedure.

20 Claims, 10 Drawing Sheets

METHODS AND APPARATUS FOR PERFORMING A MAINTENANCE PROCEDURE ON A DATA STORAGE SYSTEM

BACKGROUND OF THE INVENTION

A typical data storage system stores and retrieves data for one or more external host devices (or simply hosts). Such a data storage system typically includes processing circuitry and a set of disk drives. In general, the processing circuitry performs load and store operations on the set of disk drives on behalf of the hosts, e.g., block I/O operations using SCSI communications, ESCON communications, Fibre Channel signals, etc.

On occasion, the data storage system may require servicing by a technician. To this end, the technician typically goes to the location where the data storage system resides, and performs a service procedure on the data storage system. For example, the system may require a hardware or software upgrade in order to integrate a design improvement or to fix a design defect. As another example, a circuit board of the processing circuitry or a disk drive may fail and require replacement.

To assist the technician in performing such service procedures, some data storage system manufacturers provide scripts that automate the servicing process. That is, in response to a few electronically entered commands (e.g., instructions typed into a data storage system console device by the technician), the scripts perform a more-detailed and more-complex series of operations. As a result, without extensive knowledge of low-level aspects of the data storage system, the technician can perform a variety of service operations on the data storage system such as upgrading hardware or software, or replacing a defective data storage part by simply providing a few commands (e.g., typing information at a keyboard) and performing some physical work (swapping a failed component with a new component).

For example, suppose that a disk drive of a data storage system fails. A technician can travel to the data storage system and, at the console device of the data storage system, run a conventional script that guides the technician through a disk drive replacement procedure in an automated manner. For one conventional type of data storage system, the script first requires the technician to identify a spare disk drive for use in recovering data on the failed disk drive. After the technician identifies the spare disk drive, the script performs a data recovery procedure to recover the data. Such a recovery procedure may simply involve copying data from a mirror disk drive to the spare disk drive or, alternatively, involve more extensive data recovery operations (e.g., performing a series of logical XOR operations to recover data from related data and parity information). After the data is restored onto the spare disk drive, the script directs the technician to physically remove the failed disk drive and replace it with a new disk drive. After the technician physically replaces failed disk drive with the new disk drive, the script checks the new disk drive to make sure it has an appropriate size (e.g., that the new disk drive is at least as large as the failed disk drive). Next, the script copies the recovered data from the spare disk drive to the new disk drive. Once the data resides on the new disk drive, the script gives back the spare disk drive so that it can be used for other purposes and the disk drive replacement process is complete.

The technician can perform other types of service procedures using other conventional scripts that automate those service procedures in a manner similar to that described above for replacing a disk drive. Other examples of conventional script-driven service procedures include those for upgrading hardware or replacing failed hardware (e.g., circuit boards, etc.) and those for upgrading software (e.g., operating systems, device drivers, application level programs, etc.).

SUMMARY OF THE INVENTION

Unfortunately, there are deficiencies to using the above-described conventional scripts that automate servicing processes. For example, such scripts typically expect a service procedure to complete successfully, or if stopped before completion, to be restarted from the beginning. However, many conventional service procedures can fail in the middle leaving the data storage system in an intermediate state. When in such a state, the service procedure may not work properly if restarted because the service procedure may needed certain parameters of the data storage system to be at certain values which have since changed to values that will cause the service procedure to operate improperly.

For example, suppose that a technician travels to a customer site to replace a bad disk drive of a data storage system. Upon arrival suppose that the technician boots the console device of the data storage system and invokes a disk drive replacement script which is designed to enable the technician to (i) allocate an available spare disk drive and recover data onto the spare disk drive (e.g., copy data from a disk drive that mirrors the failed disk drive), (ii) replace the failed disk drive with a new disk drive, (iii) subsequently transfer the recovered data from the spare disk drive to the new disk drive, and (iv) finally return the spare disk drive to its initially available condition.

The technician may arrive at the customer site and successfully recover the data of the failed disk drive onto a spare disk drive. The technician may then replace the failed disk drive with a new disk drive. If the new disk drive works properly, the technician can then transfer the recovered data to the new disk drive and then return the spare disk drive to complete the service procedure.

However, suppose that the new disk drive was itself defective, i.e., another failed disk drive. Further suppose that the technician does not posses another new disk drive to swap in place of the faulty new disk drive. In this situation, the technician typically leaves the data storage system with the replacement procedure running, and travels back to the office to retrieve another new disk drive. In the meantime, the data storage system may reboot the console device since some data storage systems are programmed to reset a component (e.g., the console device) if there has not been any activity from that component after a predetermined period of time (e.g., 30 minutes).

When the technician returns with the new disk drive, the technician finds that the console device has been rebooted and that the script for replacing a failed disk drive terminated in the middle. If the technician restarts the script, the script would operate improperly. In particular, the script would start at the beginning and require the technician to allocate a spare disk drive. Unfortunately, the technician cannot allocate the initially used spare disk drive since it is already allocated. Furthermore, if a second spare disk drive is available and the technician allocates the second spare disk drive, the data storage system would then have two allocated spare disk drives.

At this point, a typical next step for the technician is to call the home office by telephone, and obtain technical assistance from a specialist such as someone with intimate knowledge of the disk drive replacement process. The specialist would provide detailed instructions that enable the technician to complete the disk drive replacement process by hand (i.e., without further using the script). In particular, the specialist would explain to the technician how to manually replace the second faulty disk drive with the new disk drive. The specialist would then explain how to transfer the recovered data from the spare disk drive to the new disk drive. Finally, the specialist would explain how to return the spare disk drive to an available state in order to manually complete the disk drive replacement procedure.

In some situations, the specialist may not be trained well enough to properly guide the technician through a servicing procedure. In such a situation, the technician may need to talk directly with an engineer. In these situations, the engineer is taken away from attending to other important such as designing new products.

Additionally, the specialist or engineer guiding the technician through completion of the procedure may forget particular steps. For example, the specialist or engineer may forget to ask the technician to verify that the new disk drive is at least the same size as the failed disk drive. If such a verification has not taken place, the technician may have inadvertently replaced the failed disk drive with a new disk drive that is too small. Accordingly, and perhaps after the technician has left the customer location and deemed the data storage system to be properly fixed, an application running on the data storage system may fill up the new disk drive expecting there to be more disk space than what is actually there. Such occurrences would require the technician to return to the customer location to diagnose and fix the problem thus increasing the servicing cost, as well as potentially lose goodwill and result in a reputation for lower quality due to the amount of trouble encountered by the customer.

In contrast to the above-described conventional scripts that attempt to automate the technician's servicing processes but which must either successfully complete, be restarted, or require a technician to manually complete if interrupted in the middle, an embodiment of the present invention is directed to techniques for accessing a data storage system (e.g., upgrading hardware or software, replacing a defective component, etc.) using a maintenance procedure that, if aborted prior to completion and after the data storage system transitions to a particular state, can restore the data storage system back to an earlier state and complete the maintenance procedure. Accordingly, a technician running the maintenance procedure does not need to either manually finish accessing the data storage system or begin the maintenance procedure from scratch. Rather, the technician can simply complete the maintenance procedure from the earlier state thus avoiding the need for taking special action (e.g., telephone assistance, manual completion, etc.).

One arrangement of the invention is directed to a data storage system that includes a data storage assembly which is capable of storing and retrieving data; and a service processor, coupled to the data storage assembly, that accesses the data storage assembly. The service processor has a memory, and a controller coupled to the memory. The controller is configured to perform part of a maintenance procedure on the data storage system such that a state of the data storage system transitions from a first state to a second state, and store, in a memory, a data structure identifying the second state. The controller is further configured to, after the maintenance procedure is aborted prior to completion of the maintenance procedure and after a transition of the state of the data storage system from the second state to a third state, (i) restore the data storage system to the second state based on the data structure stored in the memory, and (ii) complete the maintenance procedure.

In one arrangement, the controller of the service processor is further configured to, prior to performing the part of the maintenance procedure, search for the data structure in the memory to determine whether the maintenance procedure previously aborted. Accordingly, the controller can determine whether the maintenance procedure terminated without completing based on whether it finds the data structure in the memory.

Preferably, the maintenance procedure includes multiple routines. In one arrangement, the controller, when completing the maintenance procedure, is configured to (i) receive, from a user, an individual run command that identifies a routine of the maintenance procedure, and (ii) in response to the individual run command, individually run the routine of the maintenance procedure identified by the individual run command. In one arrangement, the maintenance procedure is configured to (i) receive, from a user, a skip command that identifies a routine of the maintenance procedure, and (ii) in response to the skip command, bypass the routine of the maintenance procedure identified by the skip command. In one arrangement, the maintenance procedure is configured to (i) receive, from a user, a continue command that identifies a routine of the maintenance procedure, and (ii) in response to the continue command, perform at least one of the routines of the maintenance procedure such that the last routine performed is that which is identified by the continue command. In one arrangement, the maintenance procedure is configured to (i) receive an undo command from a user, and (ii) in response to the undo command, return the data storage system to the first state based on the data structure saved in the memory. In one arrangement, the maintenance procedure is configured to save in the memory for each routine of the maintenance procedure: (i) a respective identifier that identifies that routine, (ii) a respective set of runtime variables utilized by that routine when executed, and (iii) a respective set of control variables that identifies how that routine operates relative to other routines of the maintenance procedure.

In one arrangement, the service processor further includes an input/output device coupled to the controller. The controller is further configured to display, in a graphical user interface on the input/output device, a hierarchical representation of portions of the data structure to enable a user to navigate among the hierarchical representation in order to access (i) the respective identifier, (ii) the respective set of runtime variables and (iii) the respective set of control variables for each routine of the maintenance procedure.

The features of the invention, as described above, may be employed in data storage systems, devices and methods and other computer-related components such as those manufactured by EMC Corporation of Hopkinton, Mass.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The invention is directed to techniques for accessing a data storage system (e.g., replacing or upgrading a component, installing a new component, changing a configuration, measuring performance, collecting statistics, etc.) using a maintenance procedure that, if aborted prior to completion and after the data storage system transitions to a particular state, can restore the data storage system back to an earlier state and complete the maintenance procedure. Accordingly, a user (e.g., a technician), if forced to stop the maintenance procedure prior to completion, does not need to begin the maintenance procedure from scratch or need to manually complete servicing the data storage system without the assistance of the maintenance procedure. Rather, the user can simply continue the maintenance procedure from the earlier state (e.g., where it left off) to complete accessing the data storage system in an automated manner. Accordingly, the user avoids the need for special attention (e.g., telephone assistance from a specialist, manual completion, etc.) that is often required in conventional approaches.

Figure 1:
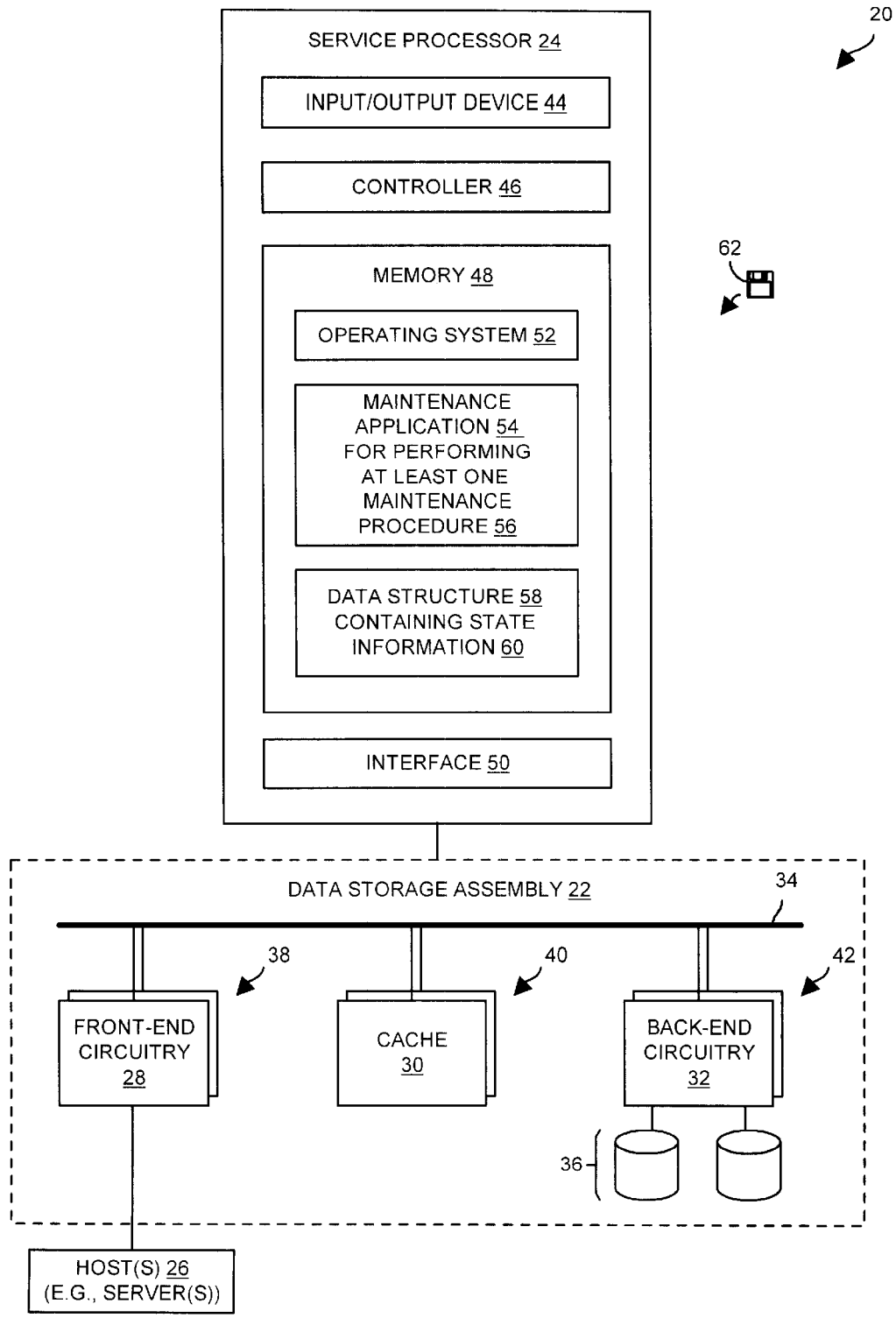
FIG. 1 is a block diagram of a data storage system which is suitable for use by the invention.

FIG. 1 shows a data storage system 20 which is suitable for use by the invention. The data storage system 20 includes a data storage assembly 22 and a service processor 24. The data storage assembly 22 is capable of storing and retrieving data on behalf of one or more hosts 26 (e.g., servers that operate as front-ends to the data storage system 20). The service processor 24 (e.g., a specially programmed laptop PC) is capable of accessing the data storage system 20 to perform servicing (e.g., upgrading hardware or software, replacing a defective component, measuring performance, etc.).

As shown in FIG. 1 and by way of example only, the data storage assembly 22 has a front-end/back-end topology with an I/O cache therebetween. That is, the data storage assembly 22 includes front-end circuitry 28, a cache 30, back-end circuitry 32, and a set of buses 34. The front-end circuitry 28 and the back-end circuitry 32 are capable of exchanging data and messages through the set of buses 34 and the cache 30. The data storage assembly 22 further includes a set of storage devices 36 (e.g., a set of disk drives) which is capable of storing the data in a non-volatile manner.

The cache 30 (e.g., volatile memory) operates as a buffer that temporarily holds data exchanged between the hosts 26 and the set of storage devices 36. The front-end circuitry 28 operates as an interface between the hosts 26 and the cache 30. Similarly, the back-end circuitry 32 operates as an interface between the cache 30 and the set of storage devices 36.

By way of example only, the front-end circuitry 28 includes multiple front-end circuit boards 38, the cache 30 includes multiple memory circuit boards 40, and the back-end circuitry 32 includes multiple back-end circuit boards 42. Such redundancy provides the data storage system 20 with fault tolerance and load balancing features. The Symmetrix™ which is manufactured by EMC Corporation of Hopkinton, Mass. includes circuitry having a topology similar to that described above, and such circuitry is suitable for use as the data storage assembly 22.

As further shown in FIG. 1, the service processor 24 includes an input/output (I/O) device 44, a controller 46, memory 48 and an interface 50. The I/O device 44 receives information (e.g., commands and data) from a user (e.g., a technician) and provides information (e.g., status, confirmation, etc.) back to the user. The interface 50 (e.g., a network interface card) couples the service processor 24 to the data storage assembly 22 thus enabling the user to access the data storage assembly 22 as well as resources of the service processor 24.

The memory 48 of the service processor 24 stores various memory constructs including an operating system 52, a maintenance application 54 for performing at least one maintenance procedure 56, and a data structure 58 (e.g., a file) containing state information 60. The operating system 52 manages resources of the service processor 24 in order to enable the service processor 24 to run applications such as the maintenance application 54. In one arrangement, the maintenance application 54 includes instructions, and the service processor 24 includes a computer processor that operates in accordance with the instructions to form the controller 46. Further details of how the service processor 24 operates using the maintenance application 54 and the data structure 58 will be provided shortly with reference to FIG. 3.

In one arrangement, a computer program product 62 (e.g., one or more CDROMs, diskettes, tapes, etc.) provides one or more of the above-listed memory constructs to the service processor 24. For example, in one arrangement, the computer program product 62 includes the maintenance application 54. In this arrangement, the application 54 can be installed on the service processor 24, and then invoked to create other memory constructs such as the data structure 58. As an alternative example, the service processor 24 can acquire one or more of the memory constructs (e.g., the maintenance application 54) through other means such as via a download over a network. Further details of the invention will now be provided with reference to FIG. 2.

Figure 2:
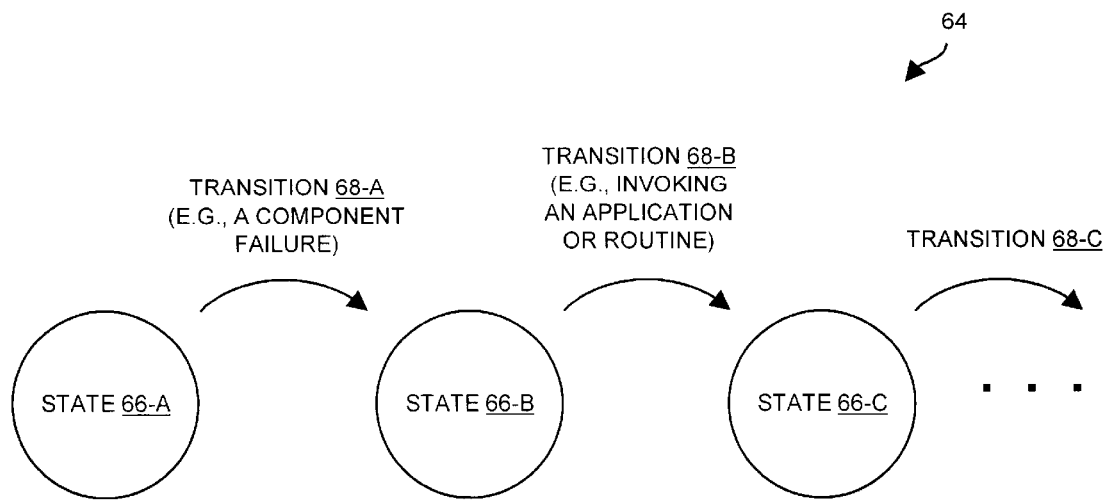
FIG. 2 is a general state diagram illustrating operating states and state transitions of the data storage system of FIG. 1.

FIG. 2 shows a state diagram 64 for the data storage system 20. During operation, the data storage system 20 can transition through a number of different states 66. The combination of a particular current state of the data storage assembly 22 and a particular current state of the service processor 24 equals the current state of the entire data storage system 20. When the particular current state of the data storage assembly 22 or of the service processor 24 changes, the data storage system 20 is viewed as going through a transition 68 from one state 66 to another state 66.

For example, suppose that the data storage system 20 initially resides in a fully operational state 66 (e.g., a state 66-A). When a component fails, the data storage system 20, in effect, goes through a transition 68 (e.g., a transition 68-A from the state 66-A to a state 66-B). Suppose that a user then invokes the maintenance application 54 on the service processor 24 in order to run a maintenance procedure 56 for replacing the failed component. When the user invokes the maintenance application 54, the data storage system 20 goes through another transition 68 to another state 66 (e.g., a transition 68-B into a state 66-C), and so on.

When the maintenance application 54 is running on the service processor 24, the user can run particular maintenance procedures 56 in order to access various parts of the data storage system 20. Preferably, the maintenance application 54 includes maintenance procedures 56 for replacing or upgrading components of the data storage system 20, installing new components, changing configurations, measuring performance, and collecting statistics, among other things. Further details of how the service processor 24 operates when a user is running the maintenance application 54 will now be provided with reference to FIG. 3.

Figure 3:
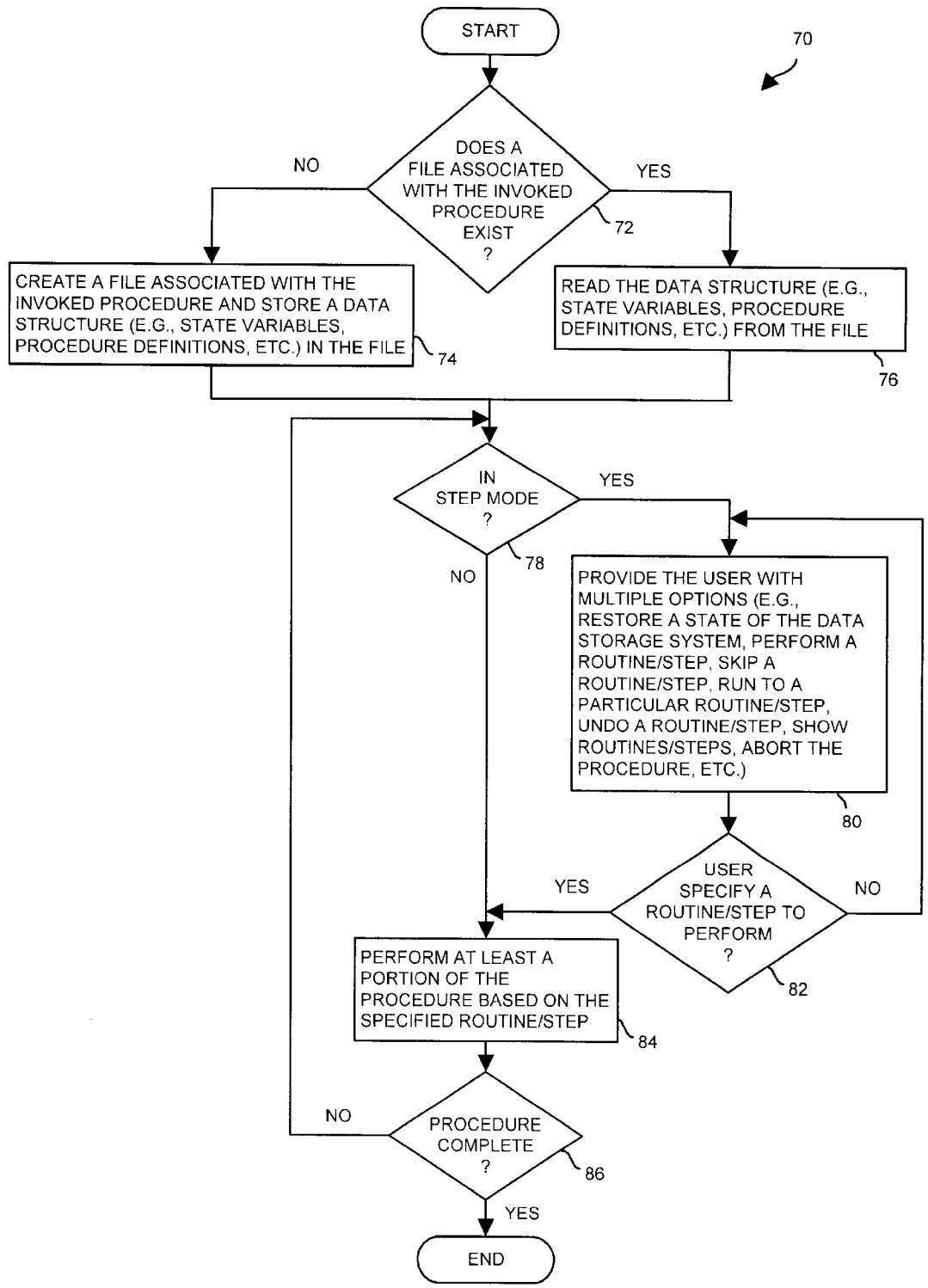
FIG. 3 is a flow chart of a procedure which is performed by a service processor of the data storage system of FIG. 1.

FIG. 3 shows a procedure 70 which is performed by the controller 46 of the service processor 24 when a user invokes a maintenance procedure 56 of the maintenance application 54 (e.g., a maintenance procedure 54 for replacing a faulty storage device 36). In step 72, when the user invokes the maintenance procedure 56, the controller 46 determines whether a file associated with the maintenance procedure 56 exists (i.e., whether a data structure 58 containing state information 60 for the invoked maintenance procedure 56 exists). In one arrangement, the controller 46 checks a particular directory of the memory 48 of the service processor 24 for the existence of a file having a particular filename. If the file does not exist, the controller 46 proceeds to step 74. However, if the file exists, the controller 46 proceeds in step 76.

In step 74, when the file does not exist, the controller 46 creates the file associated with the maintenance application 54. In one arrangement, the file is essentially the data structure 58 which contains state information 60 (e.g., state variables, procedure definitions, etc.). In another arrangement, the file includes multiple data structures including the data structure 58 containing the state information 60. For example, the controller 46 can create a file having a particular filename within a particular directory of the memory 48, and store the data structure 58 in that file.

In step 76, when the file already exists, the controller 46 reads the data structure 58 from the file in order to obtain the state information 60 (also see FIG. 1).

After steps 74 and 76, the controller 46 proceeds to step 78. In step 78, the controller 46 determines whether it is presently operating in step mode. For example, the controller 46 can check the value of a runtime variable to determine whether it is in step mode. If the controller 46 is in step mode, the controller 46 proceeds to steps 80 and 82. If the controller 46 is not in step mode, the controller 46 proceeds to step 84.

In step 80, the controller 46 provides the user with multiple options and proceeds to step 82. In particular, the controller 46 enables the user to perform a variety of routines or steps (hereinafter referred to as "a routine/step"). For example, using the I/O device 44, the user can restore a state of the data storage system 20, perform a routine/step, skip a routine/step, run to a particular routine/step, undo a routine/step, show routines/steps, or abort the invoked maintenance procedure 56.

In step 82, if the user specifies an routine/step, the controller 46 proceeds to step 84. Otherwise, the controller 46 proceeds back to step 80.

In step 84, the controller 46 performs at least a portion of the invoked maintenance procedure 56 based on the specified routine/step. For example, if the user provides a command specifying that the controller 46 perform a particular routine/step of the invoked maintenance procedure 56, and the controller 56 responds by performing that routine/step.

In step 86, the controller 46 determines whether the maintenance procedure 56 is complete. If there are no routines/steps left to perform, the controller 46 ends the maintenance procedure 56 and the procedure 70 terminates. If there is at least one routine/step left to perform, the controller 46 proceeds back to step 78.

It should be understood that the controller 46, when operating in step mode, can cycle through steps 78, 80, 82 and 84 multiple times in order to perform all or part of the invoked maintenance procedure 56. When this occurs, the controller 46 essentially operates as a step engine that enables the user to step through the various phases of the maintenance procedure 56 in a manner similar to stepping through an application using a debugger. However, it should be noted that the controller 46 (i.e., the step engine) stores state information in the non-volatile memory 48 after each routine/step is performed (i.e., after safely reaching a new state). Accordingly, if the operation of the maintenance procedure 56 is terminated before completion, the user can restore the state of the data storage system 20 by reading the state information out of the memory 48 and then continue the maintenance procedure 46 from where it left off.

Figure 4:
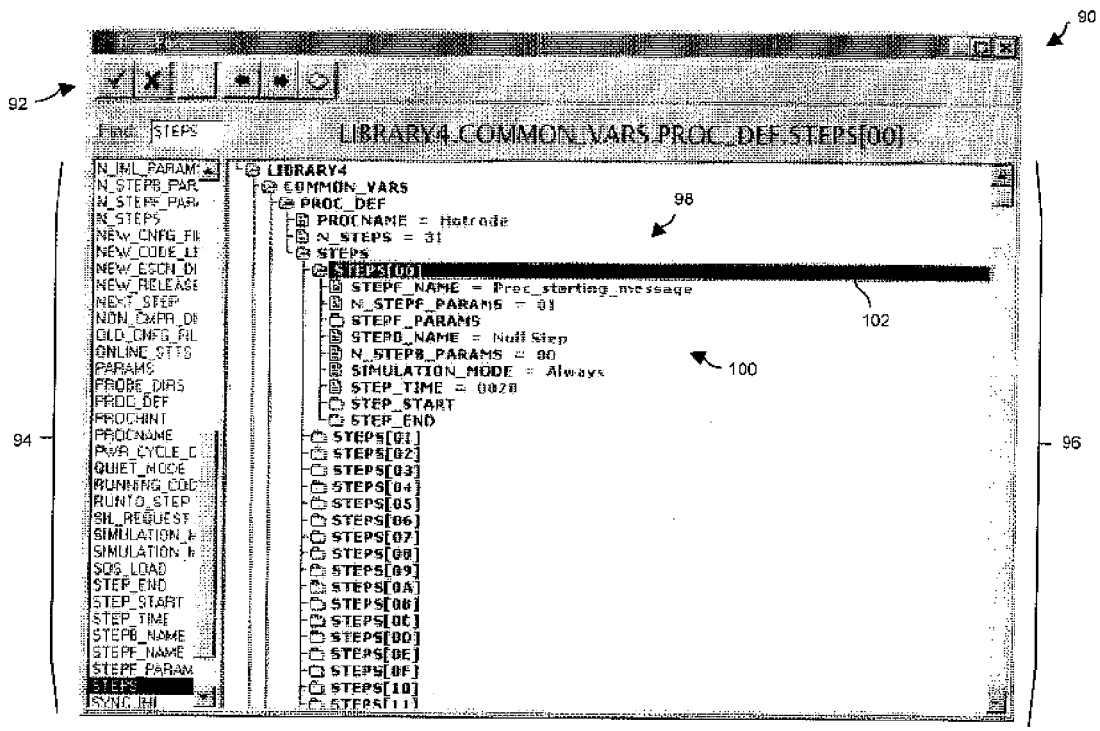
FIG. 4 is a view of a graphical user interface window which is suitable for displaying information to a user of the data storage system of FIG. 1.

FIG. 4 shows a graphical user interface (GUI) window 90 which the I/O device 44 of the service processor 24 displays to the user. The GUI window 90 includes a control bar region 92, a navigation region 94 and a main display region 96. The main display region 96 includes a hierarchical representation 98 of portions of the data structure 58 and enables the user to navigate among the hierarchical representation 98 in order to access the particular portions of the data structure 58. Preferably, the user can expand (i.e., open) and compress (i.e., close) directories, and open (or launch) individual elements of the hierarchical representation 98, in a manner similar to how folders and files operate in Windows Explorer™ which is provided by Microsoft Corp. of Redmond, Wash.

For example, the main display region 98 in the GUI window 90 of FIG. 4 shows a portion of a maintenance procedure 56 called "Hotcode" which includes 31 routines/steps (i.e., "N_STEPS=31"). The user can view a set of routine/step elements 100 belonging to a particular routine/step called "STEPS[00]" when double-clicking on an image 102 of "STEPS[00]" using a mouse. Double-clicking on individual elements (e.g., "SIMULATION_MODE") preferably results in the GUI window 90 prompting the user to provide a new value for that element (e.g., enabling the user to change the value of "SIMULATION_MODE" from "Always" to "Never" if the user wishes to make such a change).

The navigation region 94 of the GUI window 90 enables the user to quickly navigate among different portions of the data structure 54. As shown in FIG. 4, the user has selected "STEPS" in the navigation region 94 which results in the main display region 98 showing a portion of the "Hotcode" maintenance procedure 56 which is associated with routines/steps of the "Hotcode" maintenance procedure 56.

The control bar region 92 of the GUI window 90 enables the user to quickly control the operation of the maintenance procedures 56 (and the maintenance application 54 as well) by simply clicking on particular control buttons. For example, the user can activate a help feature by clicking on "?", perform a next routine/step in a series of routines/steps by clicking on a forward arrow, undo a previously performed routine/step in the series of routines/steps by clicking on a back arrow, and so on. Further details of the data structure 58 which is represented within the main display region 98 will now be provided with reference to FIG. 5.

Figure 5:
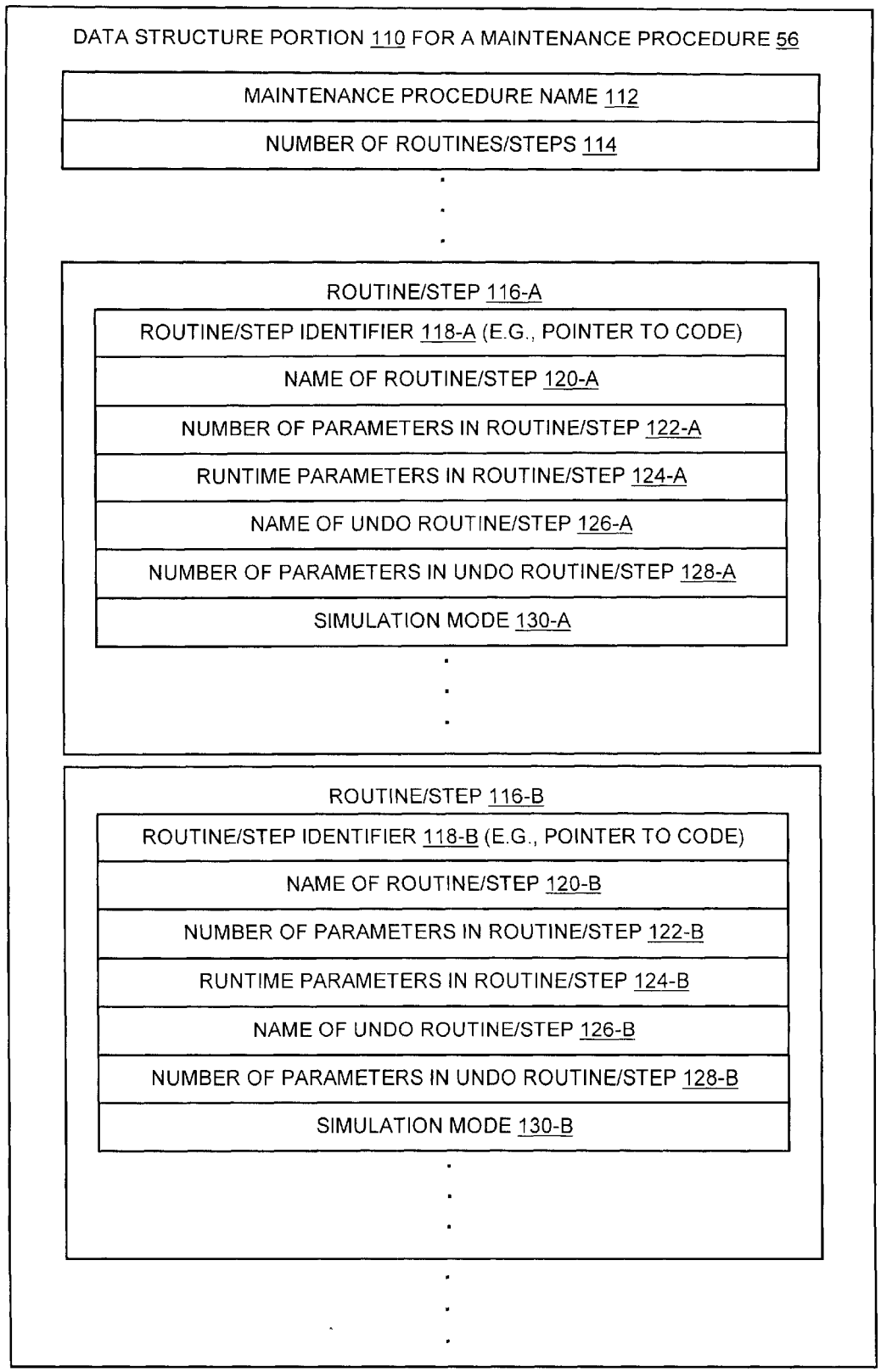
FIG. 5 is a block diagram of a data structure which is suitable for storing state information for use by the procedure of FIG. 2.

FIG. 5 shows a portion 110 of the data structure 58 for a particular maintenance procedure 56 of the maintenance application 54 (also see FIG. 1). It should be understood that the data structure 58 preferably includes other portions 110 for other maintenance procedures 56 of the maintenance application 54, as well as parameters for controlling the general operation of the maintenance application 54.

As shown in FIG. 5, the data structure portion 110 for the particular maintenance procedure 56 includes a maintenance procedure name 112, a number 114 of routines/steps in the maintenance procedure 56, and multiple routines/steps 116-A, 116-B, . . . (collectively, routines/steps 116). Each routine/step 116 defines how the controller 46 of the service processor 24 operates when performing a particular routine/step of the particular maintenance procedure 56 (e.g., a particular maintenance step when replacing a faulty component, upgrading software, measuring performance, collecting statistics, etc.).

As further shown in FIG. 5, each routine/step 116 includes a routine/step identifier 118, a name 120 of the routine/step 116, a number 122 of runtime parameters 124 for the routine/step 116, the runtime parameters 124 themselves, a name 126 of an undo routine/step, a number 128 of runtime parameters in the undo routine/step, and a simulation mode control variable 130. Preferably, the routine/step identifier 118 is a pointer to a series of low-level instructions (e.g., the actual code) for the routine/step 116. The name 120 of the routine/step 116 is preferably a character or text string which the controller 46 displays in the GUI window 90 (e.g., see "Proc_starting_message" in FIG. 4). The number 122 of runtime parameters 124 indicates how many runtime parameters there are in a set of runtime parameters used by the next routine/step 116 (e.g., see "N_STEPF_PARAMS=01" in FIG. 5). The runtime parameters 124 includes particular parameters or variables used by the routine/step (e.g., the routine/step can include a parameter that identifies a spare disk drive for a routine/step of allocating a spare disk drive when replacing a faulty disk drive). The name 126 of the undo routine/step identifies a routine/step for undoing a state change, i.e., for restoring the state of the data storage system 20 to a state prior to the current routine/step (or "Null Step" if the current routine/step is the first in the maintenance procedure 56). The number 128 of runtime parameters indicates how many runtime parameters there are in the set of runtime parameters used by the undo routine/step. The simulation mode control variable 130 allows the user to selectively enable and disable whether the controller 46 actually performs the routine/step (a useful feature when developing the maintenance procedure 56).

As mentioned earlier in connection with FIG. 4, the user can change the values of particular elements of the data structure portion 110 using the I/O device 44 of the service processor 24. In particular, the user can select individual elements by navigating and clicking over the GUI window 90 using a mouse and then entering information (e.g., using a keyboard of the I/O device 44).

It should be understood that the user (e.g., a technician) performs maintenance on the data storage system 20 by first activating the service processor 24 and launching the maintenance application 54 using the I/O device 44. The user then selects a particular maintenance procedure 56 of the maintenance application 54, and performs various steps of the procedure 70 of FIG. 3 to carry out the maintenance procedure 56. In particular, in step 82 of FIG. 3, the controller 46 of the service processor 24 provides the user with multiple options such as performing a routine/step of the maintenance procedure 56, skipping a routine/step, undoing a routine/step, etc. In step 84 of FIG. 3, the controller 46 performs at least a portion of the maintenance procedure 56 in response to the user specifying an option. Further details some of the options available to the user will now be provided with reference to FIGS. 6 through 9.

Figure 6:
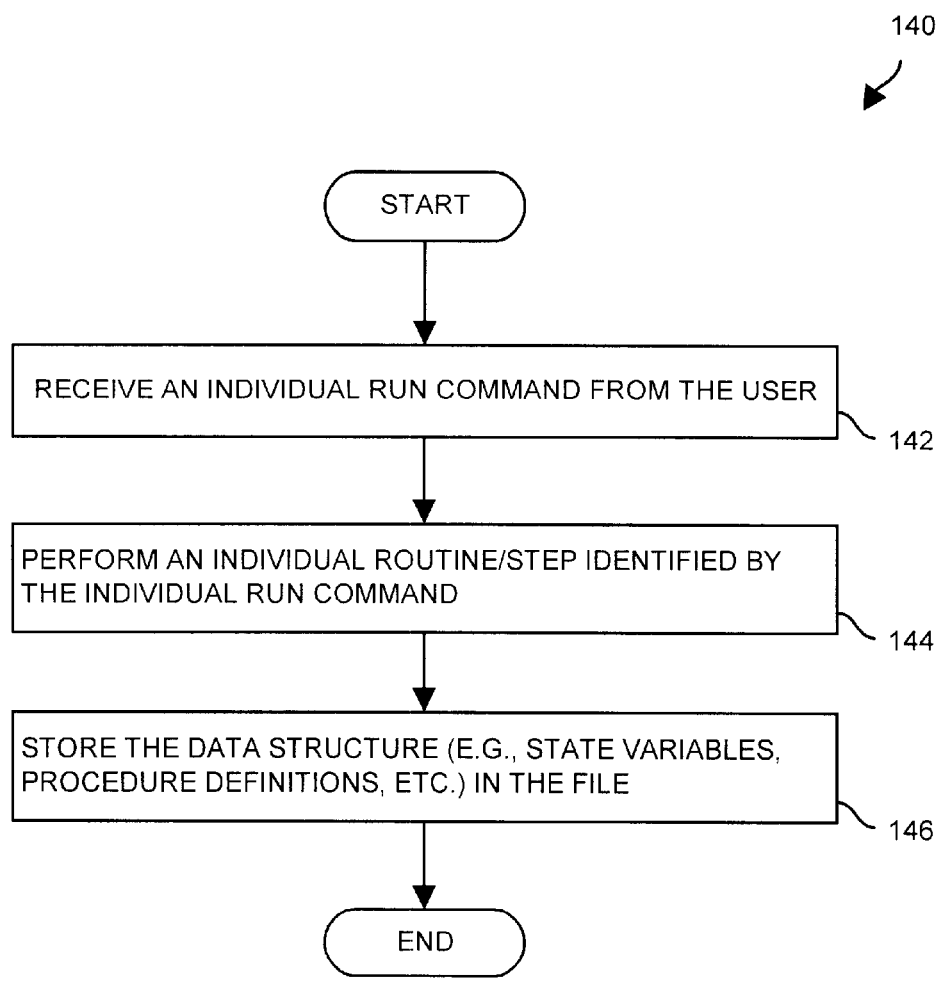
FIG. 6 is a flowchart of an option for running an individual routine/step which can be carried out by the service processor as part of the procedure of FIG. 2.

FIGS. 6 though 9 show flowcharts of procedures 140, 150, 160, 170 performed by the controller 46 to carry out, in a particular manner, one or more routines/steps of a currently invoked maintenance procedure 56 on the service processor 24. Each procedure 140, 150, 160, 170 essentially corresponds to steps 80, 82 and 84 of the procedure 70 (see FIG. 3) which describe the controller 46 providing multiple options to the user, and then carrying out at least a portion of the currently invoked maintenance procedure 56 in response to a selected option.

FIG. 6 shows a procedure 140 for performing a single routine/step of the maintenance procedure 56 on behalf of the user. In step 142, the controller 46 of the service processor 24 receives, through the I/O device 44, an individual run command to perform an individual routine/step of a maintenance procedure 56. For example, when the maintenance procedure 56 is operating in step mode, the user clicks on a forward arrow of the control bar region 92 of the GUI window 90 of FIG. 4 in order to enter the individual run command.

In step 144, the controller 46 responds to the individual run command by performing an individual routine/step (rather than running through the entire maintenance procedure 56). In particular, the controller 46 jumps to a set of instructions identified by the routine/step identifier 118 (e.g., a pointer) of the next routine/step. For example, with reference to FIG. 4, the next step is the routine/step named "Proc_starting_message".

In step 146, the controller 46 stores state information 60 within a file of the service processor memory 48, i.e., within the data structure 58 (also see FIG. 1). In one arrangement, the controller 46 writes only state information 60 for the individual routine/step that was just performed (in order to store state variables, procedure definitions, etc. for the individual routine/step that was just performed). In another arrangement, the controller 46 writes the entire data structure portion 110 for the currently invoked maintenance procedure 56. As a result of either arrangement, if the maintenance procedure 56 is subsequently terminated prior to completion, the user can recover the state of the data storage system 20 by invoking the maintenance procedure 56 of the maintenance application 54 and reading the data structure portion 110 of the maintenance procedure 56 from the memory 48. Accordingly, the user can then complete the maintenance procedure 56 by picking up somewhere in the middle of the maintenance procedure 56 without having to restart the maintenance procedure 56 from scratch or manually complete servicing without assistance of the maintenance procedure 56 as in conventional approaches.

Figure 7:
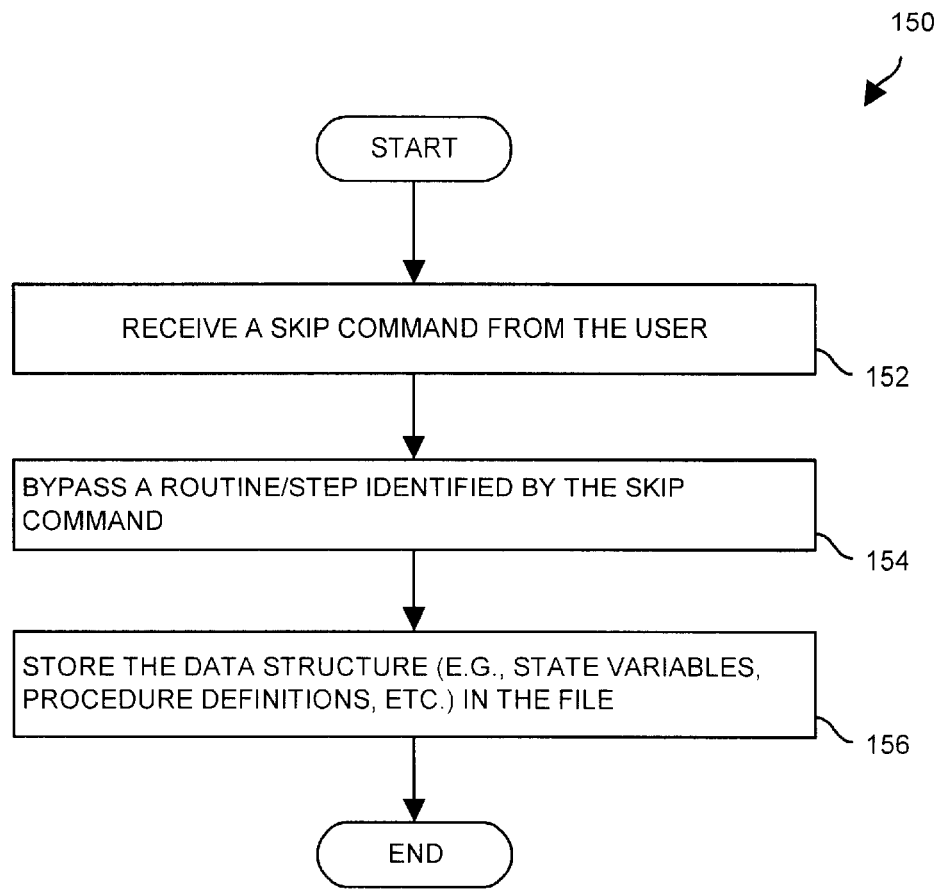
FIG. 7 is a flowchart of an option for bypassing an individual routine/step which can be carried out by the service processor as part of the procedure of FIG. 2.

FIG. 7 shows a procedure 150 for performing a skip command on behalf of the user. In step 152, the controller 46 receives a command to skip (or to bypass) a routine/step of the maintenance procedure 56. For example, with reference to FIG. 4, the user can enter a skip command to skip "STEP[01]" by clicking on "STEP[02]" and then clicking on the check mark in the control bar region 92.

In step 154, the controller 46 responds to the skip command by bypassing the routine/step (e.g., "STEP[01]") identified by the skip command and proceeding to a next step (e.g., "STEP[02]").

In step 156, the controller 46 stores state information 60, e.g., the data structure portion 110 of FIG. 5 (also see FIG. 1). Such storing of state information enables the user to return the data storage system 20 to the state that existed immediately after the procedure 150 was performed.

Figure 8:
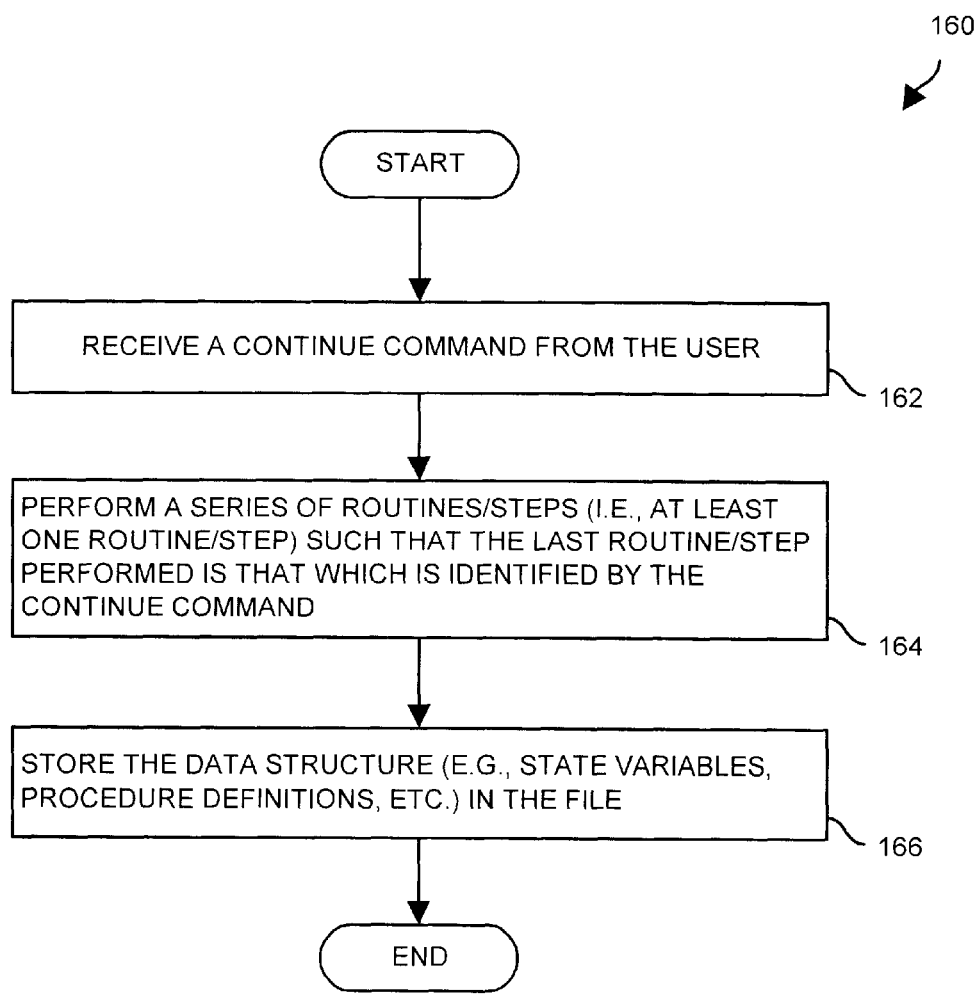
FIG. 8 is a flowchart of an option for performing a series of routines/steps which can be carried out by the service processor as part of the procedure of FIG. 2.

FIG. 8 shows a procedure 160 for performing a continue command on behalf of the user. In step 162, the controller 46 receives a continue command from the user. For example, when the maintenance procedure 56 is operating in continue mode rather than step mode, the user clicks on a forward arrow of the control bar region 92 of the GUI window 90 of FIG. 4 in order to enter the continue command.

In step 164, the controller 46 responds to the continue command by performing a series of routines/steps. In one arrangement, the controller 46 attempts to run the maintenance procedure 56 through to completion. In another arrangement, the controller 46 runs until it encounters a routine/step which is identified by the continue command (e.g., by selecting a routine/step and clicking on the forward arrow in the control bar region 92).

In step 166, the controller 46 stores state information 60. The storing of such state information 60 enables the user to later restore (if desired) the state of the data storage system 20 as it existed just after the procedure 160 completed.

Figure 9:
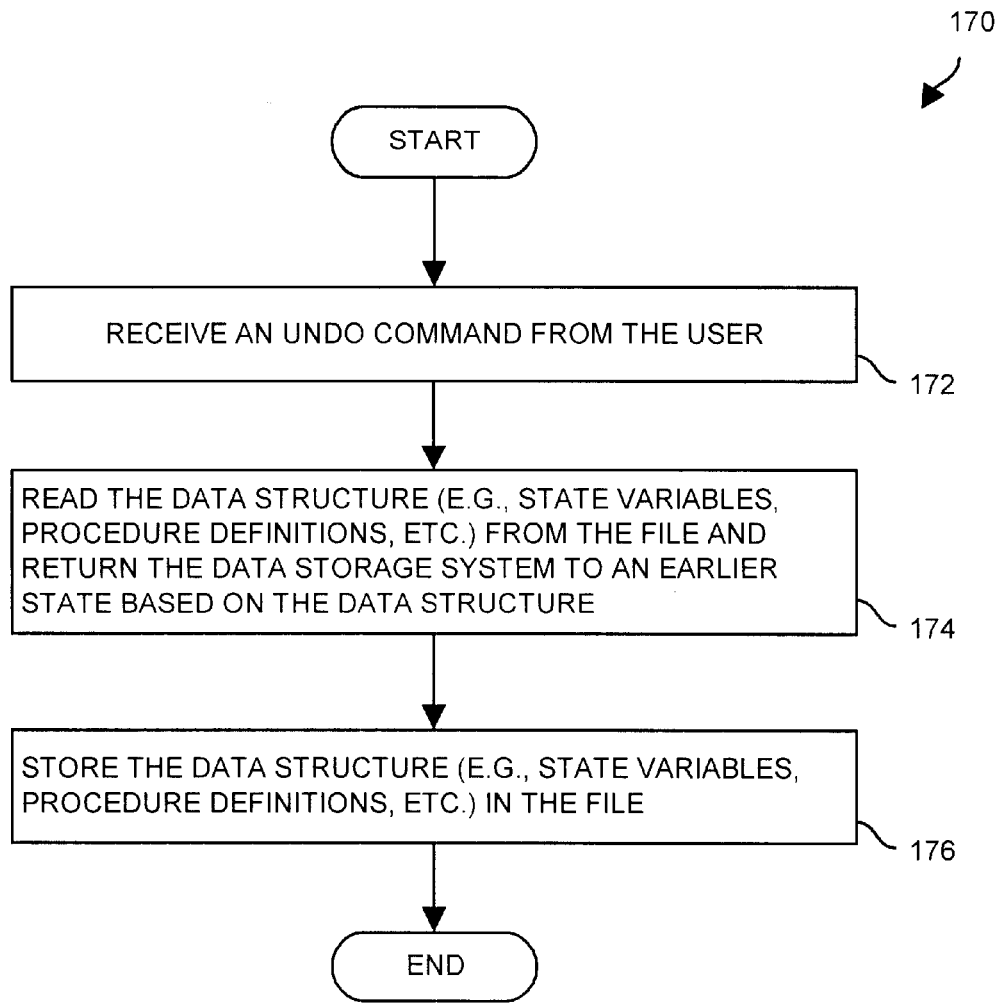
FIG. 9 is a flowchart of an option for returning the data storage system to a previous state which can be carried out by the service processor as part of the procedure of FIG. 2.

FIG. 9 shows a procedure 170 for performing an undo command on behalf of the user. In step 172, the controller 46 receives the undo command to undo a routine/step of the maintenance procedure 56. For example, when the maintenance procedure 56 is operating in step mode, the user clicks on a back arrow of the control bar region 92 of the GUI window 90 of FIG. 4 in order to enter the undo command.

In step 174, the controller 46 responds to the undo command by first reading state information from the portion 110 of the data structure 58 and returning the data storage system 20 back to an earlier state that existed just after storing the portion 110. Preferably, such operation is in accordance to instructions of an undo routine/step for transitioning the state of the data storage system 20 back to the earlier state (see the name 126 of the undo routine/step in FIG. 5).

In step 176, the controller 46 optionally re-stores the state information 60 (e.g., the portion 110 of FIG. 5) in the memory 48 (also see FIG. 1). Accordingly, using the procedure 170 of FIG. 9, the user can undo the effects of routine/steps of the maintenance procedure 56. Further details of the invention will now be provided with reference to an example and FIG. 10.

Figure 10:
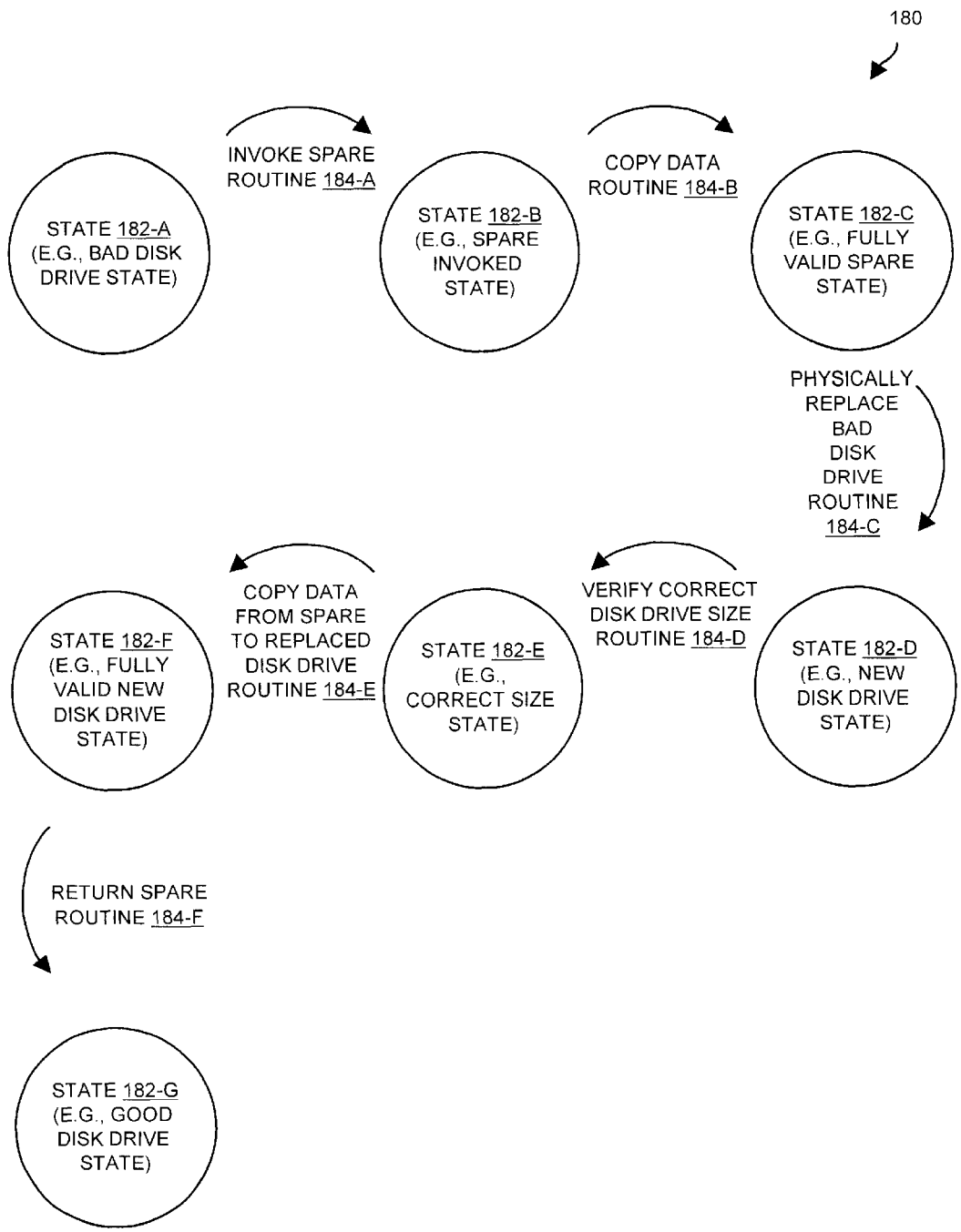
FIG. 10 is a state diagram showing an example of various operating states and state transitions of the data storage system of FIG. I when a user of the procedure of FIG. 2 replaces a bad disk drive.

FIG. 10 shows a state diagram 180 illustrating various states of the data storage system 20 when a user uses a maintenance procedure 56 of the maintenance application 54 to replace a failed disk drive (i.e., a storage device 36). Suppose that the data storage system 20 has a failed disk drive, and that a user arrives at the data storage system 20 to replace the failed disk drive. The user activates the service processor 24 and invokes a maintenance procedure 56 for replacing a failed disk drive. When the maintenance procedure 56 is invoked, the controller 46 of the service processor 24 checks to see whether a file associated with the maintenance procedure 54 exists (see step 72 of FIG. 3). Since this is the first time the user has run the maintenance procedure 54, the file does not exist, and the controller 46 creates the file (step 74 of FIG. 3).

The user then selects continue mode and the controller 46 performs the remainder of the maintenance procedure 56 (steps 78, 84 and 86 of FIG. 3). Initially the data storage system 20 is in a bad disk drive state 182-A. The controller 46 asks the user to invoke a spare disk drive. The user responds by identifying a disk drive for use as a spare. In response, the controller 46 runs an invoke spare routine 184-A which invokes the identified disk drive as the spare (state transition 184-A) and, as a result, the data storage system 20 transitions to a spare invoked state 182-B, as shown in FIG. 10. (Alternatively, the controller 46 selects the spare automatically thus alleviating the user from the burden of selecting the spare.) After the data storage system 20 reaches each new state, the controller 46 stores the state information 60 of the data storage system 20 in the memory 48 (also see the data structure portion 110 of FIG. 5).

The controller 46 then runs a copy data routine 184-B which copies and compares data from a disk drive that mirrored the failed disk drive in order to recover data on the failed disk drive and, as a result, the data storage system 20 transitions to a fully valid spare state 182-C.

Next, the controller 46 runs a replace routine 184-C which notifies the user to physically replace the failed disk drive, and the user responds by removing the failed disk drive and inserting a new disk drive in its place causing the data storage system 20 to transition to a new disk drive state 182-D.

Then, the controller 46 runs a size verification routine 184-D which compares the size of the new disk drive to the size of the failed disk drive to confirm that the new disk drive is large enough to hold the recovered data. In response, the data storage system transitions to a correct size state 182-E.

Next, the controller 46 runs a copy routine 184-E which copies the recovered data from the spare disk drive to the new disk drive and, as a result, the data storage system transitions to a fully valid new disk drive state 182-F.

Then, the controller 46 runs a return spare routine 184-F which makes the spare disk drive available again for other uses and, as a result, the data storage system transitions to a good disk drive state 182-G. The failed disk drive is thus properly replaced and the maintenance procedure 56 terminates.

It should be understood that the disk drive replacement process described above went smoothly but that situations could have arisen that prevented the user from completing the maintenance procedure 56. For example, suppose that the controller 46 reached the new disk drive state 182-D and stored state information 60 of the data storage system 20 in the memory 48. Additionally suppose that the controller 46 then determines that new disk drive was smaller than the failed disk drive thus preventing the new disk drive from holding all of the recovered data on the spare, and thus preventing the data storage system 20 from transitioning from the new disk drive state 182-D to the correct size state 182-E. Further suppose that the user does not possess another new disk drive of a proper size thus necessitating the user to leave the location of the data storage system 20 to obtain a new disk drive of the proper size. At this point, the user can abort the maintenance procedure 56, or perhaps leave the service processor running until the data storage assembly 22 reboots the service processor 24 due to inactivity after a predetermined amount of time (e.g., 30 minutes). In either case, suppose that the controller 46 terminates the maintenance procedure 56 before it can complete the maintenance procedure 56 thus causing the data storage system 20 to transition to another state 182 (e.g., a replacement failed state).

When the user returns with a new disk drive of proper size, the user reactivates the service processor 24 and invokes the maintenance procedure 56 for replacing the failed disk drive. When the maintenance procedure 56 is invoked, the controller 46 checks to see whether a file associated with the maintenance procedure 54 exists (again, see step 72 of FIG. 3). This time the file exists, and the controller 46 reads the data structure 58 from the file (step 76) in order to restore the data storage system 20 to the new disk drive state 182-D. In this manner, the condition of the data storage system 20 has been as it was just after reaching the new disk drive state 182-D. The user then can then select continue mode and the controller 46 performs the remainder of the maintenance procedure 56 (steps 78, 84 and 86). Unlike conventional approaches which either must be completed successfully or restarted from scratch, the maintenance procedure 56 picked up somewhere in the middle and did not need to re-run earlier-completed routines (see routines 184-A, 184-B, and 184-C). Furthermore, the user did not need to manually complete the disk drive replacement process without the assistance of the maintenance procedure 56 by enlisting the help of a specialist or engineer.

It should be understood that the maintenance procedure 56 is robust and provides the user with multiple options. For example, after the user restores the data storage system 20 to the new disk drive state 182-D, the user can select step mode and single step through the remainder of the maintenance procedure 56 (see steps 80 and 82 of FIG. 3 and the procedure 140 of FIG. 6) using the GUI window 90 of FIG. 4. As another example, the user can undo routines/steps such as providing the controller 46 with an undo command to transition the data storage system 20 from the new disk drive state 182-D back to the fully valid spare state 182-C (also see the procedure 170 of FIG. 9). As yet another example, the user can perform other options such as skipping a routine/step, continuing to a particular routine/step, etc.

As described above, the invention is directed to techniques for accessing a data storage system 20 (e.g., replacing or upgrading a component, installing a new component, changing a configuration, measuring performance, collecting statistics, etc.) using a maintenance procedure 56 that, if aborted prior to completion and after the data storage system 20 transitions to a particular state, can restore the data storage system back to an earlier state and complete the maintenance procedure 56. Accordingly, a user (e.g., a technician), if forced to stop the maintenance procedure 56 prior to completion, does not need to begin the maintenance procedure 56 from scratch or need to manually complete servicing the data storage system without the assistance of the maintenance procedure 56. Rather, the user can simply continue the maintenance procedure 56 from the earlier state (e.g., where it left off) to complete accessing the data storage system in an automated manner. Accordingly, the user avoids the need for special attention (e.g., telephone assistance from a specialist, manual completion, etc.) that is often required in conventional approaches. The features of the invention, as described above, may be employed in data storage systems, circuits and procedures and other data storage related components such as those manufactured by EMC Corporation of Hopkinton, Massachusetts.

While this invention has been particularly shown and described with references to preferred embodiments thereof, it will be understood by those skilled in the art that various changes in form and details may be made therein without departing from the spirit and scope of the invention as defined by the appended claims.

For example, it should be understood that the data storage assembly 22 was described above as including circuitry having a front-end/back-end topology by way of example only. Other data storage assemblies are suitable for use by the invention as well.

Additionally, it should be understood that the maintenance procedure 56 was described above as being run on the service processor 24 by a user at the location of the data storage system 20. In another arrangement, the user runs the maintenance procedure 56 remotely such as through a remote I/O device that connects to the data storage assembly 22 through a network. The remote I/O device can communicate with the data storage assembly 22 using non-block-based communications such as TCP/IP (e.g., through a network interface of the data storage assembly 22) or block-based commands (e.g., in a manner similar to that of a traditional host 26).

Furthermore, it should be understood that the memory 48 was described above as being disk drive memory by way of example only. Other non-volatile forms of memory are suitable for use as well such as magnetic tape, CDs, etc.

Moreover, the data structure 58 was described as residing in the memory 48 of the service processor 24 by way of example only. In other arrangements, the data structure 58 resides in other locations such as in the set of storage devices 36 of the data storage assembly 22.

Additionally, it should be understood that the maintenance procedure 56 was described above as being used to replace a failed disk drive by way of example only. Other maintenance procedures 56 can be used by the invention to perform other types of maintenance tasks such as replacing or upgrading a circuit board or circuit board component, installing a new circuit board or circuit board component, changing a configuration of the data storage system, installing or upgrading software, monitoring system performance, collecting statistics, etc.

Furthermore, it should be understood that the GUI window 90 of FIG. 4 can provide the user with the ability to edit or create new maintenance procedures 56. Editing an existing maintenance procedure 56 can involve inserting and/or deleting one or more routines/steps. Creating a new maintenance procedure 56 can involve writing one from scratch or, alternatively, copying an existing maintenance procedure 56, renaming it and modifying it.

What is claimed is:

1. A method for accessing a data storage system, the method comprising the steps of:

performing part of a maintenance procedure on the data storage system such that a state of the data storage system transitions from a first state to a second state;

storing, in a memory, a data structure identifying the second state; and after aborting the maintenance procedure prior to completion of the maintenance procedure and after a transition of the state of the data storage system from the second state to a third state, (i) restoring the data storage system to the second state based on the data structure stored in the memory, and (ii) completing the maintenance procedure;

wherein the maintenance procedure includes multiple routines, and wherein the step of restoring and completing includes the steps of:

receiving, from a user, an individual run command that identifies a routine of the maintenance procedure; and in response to the individual run command, individually running the routine of the maintenance procedure identified by the individual run command.

2. The method of claim 1, further comprising the step of:

prior to the step of performing, searching for the data structure in the memory to determine whether the maintenance procedure previously aborted.

3. A method for accessing a data storage system, the method comprising the steps of:

performing part of a maintenance procedure on the data storage system such that a state of the data storage system transitions from a first state to a second state;

storing, in a memory, a data structure identifying the second state; and after aborting the maintenance procedure prior to completion of the maintenance procedure and after a transition of the state of the data storage system from the second state to a third state, (i) restoring the data storage system to the second state based on the data structure stored in the memory, and (ii) completing the maintenance procedure;

wherein the maintenance procedure includes multiple routines, and wherein the step of restoring and completing includes the steps of:

receiving, from a user, a skip command that identifies a routine of the maintenance procedure; and in response to the skip command, bypassing the routine of the maintenance procedure identified by the skip command.

4. A method for accessing a data storage system, the method comprising the steps of:

performing part of a maintenance procedure on the data storage system such that a state of the data storage system transitions from a first state to a second state;

storing, in a memory, a data structure identifying the second state; and after aborting the maintenance procedure prior to completion of the maintenance procedure and after a transition of the state of the data storage system from the second state to a third state, (i) restoring the data storage system to the second state based on the data structure stored in the memory, and (ii) completing the maintenance procedure;

wherein the maintenance procedure includes a sequence of routines, and wherein the step of restoring and completing includes the steps of:

receiving, from a user, a continue command that identifies a routine of the maintenance procedure; and in response to the continue command, performing at least one of the routines of the maintenance procedure such that the last routine performed is that which is identified by the continue command.

5. A method for accessing a data storage system, the method comprising the steps of:

performing part of a maintenance procedure on the data storage system such that a state of the data storage system transitions from a first state to a second state;

storing, in a memory, a data structure identifying the second state; and after aborting the maintenance procedure prior to completion of the maintenance procedure and after a transition of the state of the data storage system from the second state to a third state, (i) restoring the data storage system to the second state based on the data structure stored in the memory, and (ii) completing the maintenance procedure;

wherein the step of storing the data structure includes saving the data structure in the memory such that the data structure further identifies the first state, wherein the maintenance procedure includes multiple routines, and wherein the method further comprises the steps of:

receiving an undo command from a user; and in response to the undo command, returning the data storage system to the first state based on the data structure saved in the memory.

6. A method for accessing a data storage system, the method comprising the steps of:

performing part of a maintenance procedure on the data storage system such that a state of the data storage system transitions from a first state to a second state;

storing, in a memory, a data structure identifying the second state; and after aborting the maintenance procedure prior to completion of the maintenance procedure and after a transition of the state of the data storage system from the second state to a third state, (i) restoring the data storage system to the second state based on the data structure stored in the memory, and (ii) completing the maintenance procedure;

wherein the maintenance procedure includes multiple routines, and wherein the step of storing the data structure includes the step of:

saving in the memory for each routine of the maintenance procedure:

a respective identifier that identifies that routine;

a respective set of runtime variables utilized by that routine when executed; and a respective set of control variables that identifies how that routine operates relative to other routines of the maintenance procedure.

7. The method of claim 6, further comprising the step of:

displaying, in a graphical user interface, a hierarchical representation of portions of the data structure to enable a user to navigate among the hierarchical representation in order to access (i) the respective identifier, (ii) the respective set of runtime variables and (iii) the respective set of control variables for each routine of the maintenance procedure.

8. An apparatus for accessing a data storage assembly of a data storage system, the apparatus comprising:

an interface that couples to the data storage assembly of the data storage system;

a memory; and a controller coupled to the interface and the memory, the controller being configured to:

perform part of a maintenance procedure on the data storage system such that a state of the data storage system transitions from a first state to a second state, store, in a memory, a data structure identifying the second state, and after aborting the maintenance procedure prior to completion of the maintenance procedure and after a transition of the state of the data storage system from the second state to a third state, (i) restore the data storage system to the second state based on the data structure stored in the memory, and (ii) complete the maintenance procedure wherein the maintenance procedure includes multiple routines; and wherein the controller, when completing the maintenance procedure, is configured to:
- receive, from a user, an individual run command that identifies a routine of the maintenance procedure; and
- in response to the individual run command, individually run the routine of the maintenance procedure identified by the individual run command.

9. The apparatus of claim 8, wherein the controller is further configured to:
- prior to performing the part of the maintenance procedure, search for the data structure in the memory to determine whether the maintenance procedure previously aborted.

10. An apparatus for accessing a data storage assembly of a data storage system, the apparatus comprising:
- an interface that couples to the data storage assembly of the data storage system;
- a memory; and
- a controller coupled to the interface and the memory, the controller being configured to:
  - perform part of a maintenance procedure on the data storage system such that a state of the data storage system transitions from a first state to a second state,
  - store, in a memory, a data structure identifying the second state, and
  - after aborting the maintenance procedure prior to completion of the maintenance procedure and after a transition of the state of the data storage system from the second state to a third state, (i) restore the data storage system to the second state based on the data structure stored in the memory, and (ii) complete the maintenance procedure;

wherein the maintenance procedure includes multiple routines; and wherein the controller, when completing the maintenance procedure, is configured to:
- receive, from a user, a skip command that identifies a routine of the maintenance procedure; and
- in response to the skip command, bypass the routine of the maintenance procedure identified by the skip command.

11. An apparatus for accessing a data storage assembly of a data storage system, the apparatus comprising;
- an interface that couples to the data storage assembly of the data storage system;
- a memory; and
- a controller coupled to the interface and the memory, the controller being configured to:
  - perform part of a maintenance procedure on the data storage system such that a state of the data storage system transitions from a first state to a second state,
  - store, in a memory, a data structure identifying the second state, and
  - after aborting the maintenance procedure prior to completion of the maintenance procedure and after a transition of the state of the data storage system from the second state to a third state, (i) restore the data storage system to the second state based on the data structure stored in the memory, and (ii) complete the maintenance procedure;

wherein the maintenance procedure includes a sequence of routines; and wherein the controller, when completing the maintenance procedure, is configured to:
- receive, from a user, a continue command that identifies a routine of the maintenance procedure; and
- in response to the continue command, perform at least one of the routines of the maintenance procedure such that the last routine performed is that which is identified by the continue command.

12. An apparatus for accessing a data storage assembly of a data storage system, the apparatus comprising:
- an interface that couples to the data storage assembly of the data storage system;
- a memory; and
- a controller coupled to the interface and the memory, the controller being configured to:
  - perform part of a maintenance procedure on the data storage system such that a state of the data storage system transitions from a first state to a second state,
  - store, in a memory, a data structure identifying the second state, and
  - after aborting the maintenance procedure prior to completion of the maintenance procedure and after a transition of the state of the data storage system from the second state to a third state, (i) restore the data storage system to the second state based on the data structure stored in the memory, and (ii) complete the maintenance procedure;

wherein the controller is further configured to store the data structure in the memory such that the data structure further identifies the first state;

wherein the maintenance procedure includes multiple routines; and wherein the controller, when completing the maintenance procedure, is configured to:
- receive an undo command from a user; and
- in response to the undo command, return the data storage system to the first state based on the data structure saved in the memory.

13. An apparatus for accessing a data storage assembly of a data storage system, the apparatus comprising:
- an interface that couples to the data storage assembly of the data storage system;
- a memory; and
- a controller coupled to the interface and the memory, the controller being configured to:
  - perform part of a maintenance procedure on the data storage system such that a state of the data storage system transitions from a first state to a second state,
  - store, in a memory, a data structure identifying the second state, and
  - after aborting the maintenance procedure prior to completion of the maintenance procedure and after a transition of the state of the data storage system from the second state to a third state, (i) restore the data storage system to the second state based on the data structure stored in the memory, and (ii) complete the maintenance procedure;

wherein the maintenance procedure includes multiple routines; and wherein the controller, when completing the maintenance procedure, is configured to:
- save in the memory for each routine of the maintenance procedure:
  - a respective identifier that identifies that routine;
  - a respective set of runtime variables utilized by that routine when executed; and
  - a respective set of control variables that identifies how that routine operates relative to other routines of the maintenance procedure.

14. The apparatus of claim 13, further comprising:

an input/output device coupled to the controller, wherein the controller is further configured to display, in a graphical user interface on the input/output device, a hierarchical representation of portions of the data structure to enable a user to navigate among the hierarchical representation in order to access (i) the respective identifier, (ii) the respective set of runtime variables and (iii) the respective set of control variables for each routine of the maintenance procedure.

15. A data storage system, comprising:

a data storage assembly which is capable of storing and retrieving data; and a service processor, coupled to the data storage assembly, that accesses the data storage assembly, the service processor having:

a memory; and a controller coupled to the memory, the controller being configured to:

perform part of a maintenance procedure on the data storage system such that a state of the data storage system transitions from a first state to a second state, store, in a memory, a data structure identifying the second state, and after aborting the maintenance procedure prior to completion of the maintenance procedure and after a transition of the state of the data storage system from the second state to a third state, (i) restore the data storage system to the second state based on the data structure stored in the memory, and (ii) complete the maintenance procedure wherein the controller of the service processor is further configured to store the data structure in the memory such that the data structure further identifies the first state; wherein the maintenance procedure includes multiple routines; and wherein the controller of the service processor, when completing the maintenance procedure, is configured to:

receive an undo command from a user; and in response to the undo command, return the data storage system to the first state based on the data structure saved in the memory.

16. The data storage system of claim 15 wherein the controller of the service processor is further configured to:

prior to performing the part of the maintenance procedure, search for the data structure in the memory to determine whether the maintenance procedure previously aborted.

17. A data storage system, comprising:

a data storage assembly which is capable of storing and retrieving data; and a service processor, coupled to the data storage assembly, that accesses the data storage assembly, the service processor having:

a memory; and a controller coupled to the memory, the controller being configured to:

perform part of a maintenance procedure on the data storage system such that a state of the data storage system transitions from a first state to a second state, store, in a memory, a data structure identifying the second state, and after aborting the maintenance procedure prior to completion of the maintenance procedure and after a transition of the state of the data storage system from the second state to a third state, (i) restore the data storage system to the second state based on the data structure stored in the memory, and (ii) complete the maintenance procedure;

wherein the maintenance procedure includes multiple routines; and wherein the controller of the service processor, when completing the maintenance procedure, is configured to:

save in the memory for each routine of the maintenance procedure:

a respective identifier that identifies that routine;

a respective set of runtime variables utilized by that routine when executed; and a respective set of control variables that identifies how that routine operates relative to other routines of the maintenance procedure.

18. The data storage system of claim 17 wherein the service processor further includes:

an input/output device coupled to the controller, wherein the controller is further configured to display, in a graphical user interface on the input/output device, a hierarchical representation of portions of the data structure to enable a user to navigate among the hierarchical representation in order to access (i) the respective identifier, (ii) the respective set of runtime variables and (iii) the respective set of control variables for each routine of the maintenance procedure.

19. A computer program product that includes a computer readable medium having instructions stored thereon for accessing a data storage system, such that the instructions, when carried out by a computer, cause the computer to perform the steps of:

performing part of a maintenance procedure on the data storage system such that a state of the data storage system transitions from a first state to a second state;

storing, in a memory of the computer, a data structure identifying the second state; and after aborting the maintenance procedure prior to completion of the maintenance procedure and after a transition of the state of the data storage system from the second state to a third state, (i) restoring the data storage system to the second state based on the data structure stored in the memory, and (ii) completing the maintenance procedure;

wherein the maintenance procedure includes multiple routines, and wherein the step of restoring and completing includes the steps of:

receiving, from a user, an individual run command that identifies a routine of the maintenance procedure; and in response to the individual run command, individually running the routine of the maintenance procedure identified by the individual run command.

20. The computer program product of claim 1, wherein the instructions, when carried out by a computer, cause the computer to further perform the step of:

prior to the step of performing, searching for the data structure in the memory to determine whether the maintenance procedure previously aborted.

* * * * *

UNITED STATES PATENT AND TRADEMARK OFFICE
CERTIFICATE OF CORRECTION

PATENT NO.    : 6,760,862 B1
DATED         : July 6, 2004
INVENTOR(S)   : Moshe Schreiber, Arod Shatil and Stefano Sguazzin It is certified that error appears in the above-identified patent and that said Letters Patent is hereby corrected as shown below:

Column 17,
Line 50, "the apparatus comprising;" should read -- the apparatus comprising: --

Signed and Sealed this

Twenty-eighth Day of December, 2004

JON W. DUDAS
*Director of the United States Patent and Trademark Office*